United States Patent [19]
Partin

[11] 3,976,086
[45] Aug. 24, 1976

[54] CLEANING OF DRY CATALYST BEDS

[75] Inventor: Clyde Partin, New York, N.Y.

[73] Assignee: The Anaconda Company, New York, N.Y.

[22] Filed: Dec. 12, 1974

[21] Appl. No.: 532,032

[52] U.S. Cl. .................... 134/6; 55/96; 134/21; 134/25 R; 252/411 R
[51] Int. Cl.² .................... B08B 5/04
[58] Field of Search .......... 134/6, 21, 25 R; 210/80, 271, 280; 252/411 R, 411 S; 23/288 B; 55/282, 289, 291, 294, 296, 301, 96, 98

[56] References Cited
UNITED STATES PATENTS

| | | | |
|---|---|---|---|
| 293,747 | 2/1884 | Hyatt | 210/80 |
| 2,131,002 | 9/1938 | Streander | 210/271 X |
| 3,303,635 | 2/1967 | Sherrill | 55/96 |
| 3,341,365 | 9/1967 | Berz | 134/25 R |
| 3,552,572 | 1/1971 | Lehmann | 210/271 |
| 3,594,991 | 7/1971 | Berz | 55/294 |

Primary Examiner—S. Leon Bashore
Assistant Examiner—Richard V. Fisher
Attorney, Agent, or Firm—Pennie & Edmonds

[57] ABSTRACT

An improved process particularly adapted for cleaning dry particulate matter of a catalyst filter bed without requiring the removal, screening and reinstating of such material forming the catalyst filter bed. Basically, the process embodies the steps of arranging a screen over the top surface of the filter bed, subjecting the surface of the screen and filter bed to a vacuum to thereby pull impurities, such as dust and the like, from the filter bed and through the screen, advancing a rake device through the filter bed in a first direction of movement for loosening the impurities and for providing greater access thereto, subjecting the screen and filter bed to a vacuum thereby pulling additional impurities from the filter bed and through the screen, and for providing greater access to the impurities, again advancing the rake device through the filter bed in a second direction which is generally transverse to the first direction of movement of the rake device for loosening the impurities and for producing greater access thereto, and again subjecting the screen filter bed to a vacuum to thereby pull additional impurities from the filter bed and through the screen.

4 Claims, 3 Drawing Figures

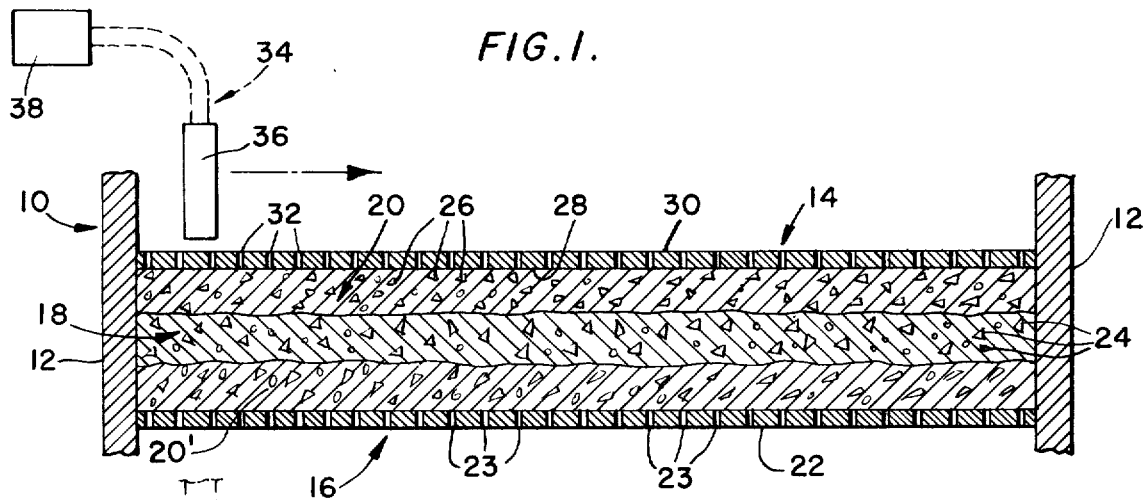
FIG. 1.
FIG. 2
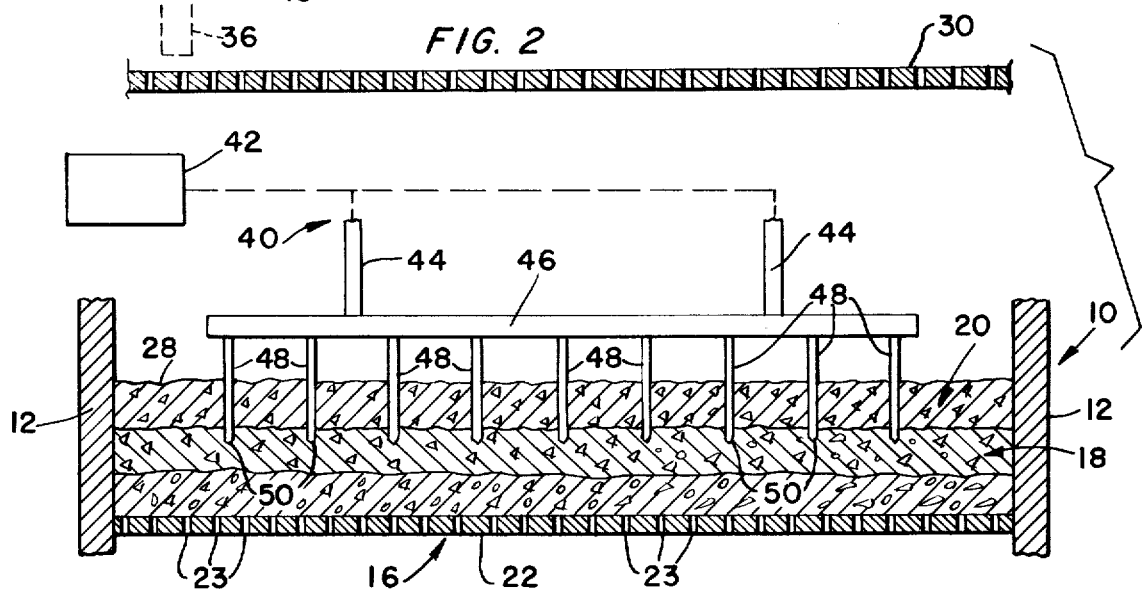
FIG. 3.
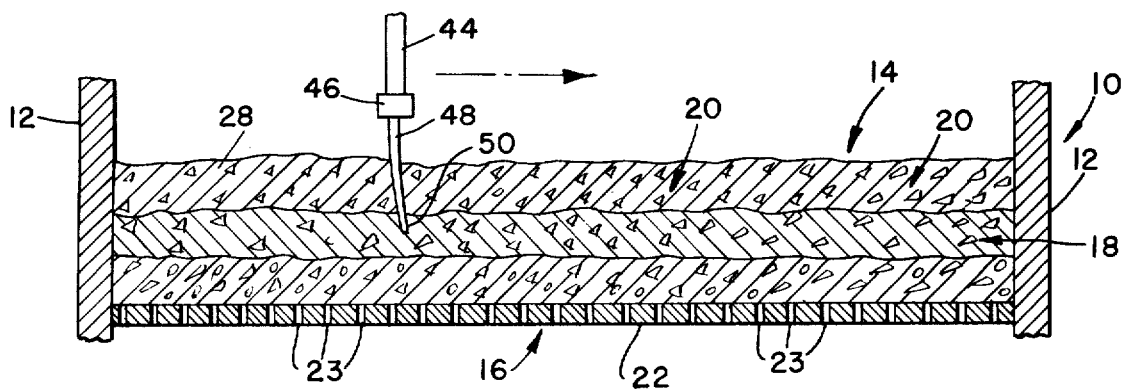

CLEANING OF DRY CATALYST BEDS

BACKGROUND OF THE INVENTION

1. Field of the Invention

This invention is directed to the cleaning of filter beds. More particularly, it is related to an improved process for cleaning a dry catalyst mass, such as used in a sulfuric acid plant or the like.

2. Description of the Prior Art

The catalyst mass or bed primary function is to enhance the reaction of $SO_2$ to $SO_3$. It is intended that all gases passing through the catalyst be free of all particulate matter, however, since no gas cleaning plant does a perfect job of particulate removal, some particles do reach the catalyst. Over a period of time, these particles build up in the catalyst and cause a resistance to gas flow which eventually leads to reduced flow rates and lower production of acid. In this event, such accumulation will prevent the efficient operation of the catalyst bed and thereby render it ineffective to perform its intended function. Accordingly, it, therefore, becomes necessary for the catalyst bed to be appropriately cleaned in such a manner as to render the bed once again effective for enhancing its cooperation with the gases which are being treated.

Heretofore known prior art methods for cleaning the catalyst bed ordinarily require that the catalyst mass and a layer of silicious aggregate material, which forms a portion of the catalyst bed, be removed from the tray upon which they normally rest. Subsequently, the aggregate which form the silicious layer and catalyst mass are screened and then reloaded onto the tray for later use. In some instances, however, after extensive use the catalyst mass and silicious layer are replaced with newer materials. One approach in the prior art has been to hand remove and screen the catalyst mass and silicious layer. This approach, however, is time consuming and costly. Another approach is to utilize a catalyst services contractor to remove, screen, and reload the catalyst mass as well as silicious layer back onto the tray. While utilization of a service contractor saves substantial time as compared with hand removal, this particular approach, nevertheless, also suffers similar shortcomings in that it is also relatively time consuming and expensive. Such approach, when used for a catalyst bed of 27,368 liters, for example, frequently requires an eight man shift to remove and screen the particulate matter of the catalyst mass. In addition, the downtime is about 70 hours.

Another shortcoming associated with such of the abovenoted prior art methods for screening the catalyst mass or aggregate, is that it is rather usual for at least 5% of the total catalyst mass to be lost through screening abrasion. As can be readily appreciated, the typical prior art approaches of cleaning catalyst filter beds of accumulated impurities is a rather time and labor consuming process, and one in which the filter bed is maintained out of useful operation for relatively long periods of time. Accordingly, such known techniques are expensive, especially when further considering the loss of time incurred because the catalyst bed is maintained out of normal operation.

SUMMARY OF THE INVENTION

Briefly stated, the present invention is directed to an improved process for cleaning impurities from dry filter beds which overcomes the aforenoted shortcomings by providing a novel and improved process, whereby such process is performed in a relatively less time consuming and expensive manner.

Essentially, hereinafter set forth, a vacuum cleaning process is disclosed for use in cleaning accumulated impurities from the catalyst bed used in a sulfuric acid plant or the like.

This process uses a vacuum device, a screen having formed therein a plurality of openings of a size smaller than that of the particulate matter which forms the silicious layer covering the catalyst mass, and a rake device having a plurality of depending rake tines. The screen is generally horizontally disposed with respect to and vertically arranged over the top surface of the silicious layer for preventing any of the particulate matter from being removed into the vacuum. The vacuum is arranged to traverse substantially the entire surface of the screen so as to thereby pull accumulated impurities, such as dust and other similar particles, through the screen. At the completion of this first vacuuming operation, the screen is removed from over the silicious layer. Thereafter, the rake device is operated so that the tines associated therewith extend through the silicious layer and at least a top portion of the particulate matter of the catalyst mass. Such rake device is advanced through in a first direction. The resulting raking action is effective for breaking surface encrustations which may have formed and also serves to provide greater exposure and access to the remaining accumulated impurities. Once again the screen in appropriately placed over the silicious layer, and the vacuum device commences to vacuum the entire surface of the screen so as to thereby pull additional impurities through the openings formed in the screen. At the completion of this step, the screen is again removed, so as to permit another raking action to be performed. In this particular raking action, however, the rake device with the tines at a similar depth is actuated to traverse the silicious layer and catalyst mass in a second direction which is generally transverse or normal to that of the first direction of rake travel. Such action serves to further facilitate the breaking up of surface encrustations and enhances further access and exposure to any remaining impurities. Upon the completion of this last mentioned raking step, the screen is again replaced on the top surface of the silicious layer and the vacuuming device revacuums substantially the entire surface thereof so as to pull additional accumulated impurities through the screen.

The above, as well as other objects, features, and advantages of the present invention will become apparent upon a reading of a description of a preferred embodiment of the present invention made in accordance with the principles thereof, when viewed in conjunction with the accompanying drawings wherein like reference numerals indicate like structure throughout the several views:

BRIEF DESCRIPTION OF THE DRAWINGS

FIG. 1 is a diagrammatic side elevational view illustrating a dry catalyst filter bed being subjected to one of the cleaning operational steps performed in accordance with the principles of the present invention;

FIG. 2 is a diagrammatic end elevational view illustrating the catalyst filter bed as shown in FIG. 1 but being subject to another operational step performed in accordance with the principles of the present invention; and, FIG. 3 is a diagrammatic end elevational view similar to that shown in FIG. 2 but illustrating another one of the cleaning operational steps performed in accordance with the principles of the present invention.

DESCRIPTION OF THE PREFERRED EMBODIMENT

Referring now to the Figures of the drawings there is depicted, in diagrammatic form, a tank or receptacle 10 which may be of the type generally adapted for use in a sulfuric acid plant. The tank 10 is essentially defined by enclosure walls 12 which define a channel 14. Such tank or receptacle 10 is of known design and construction and may serve to permit the passage therethrough of gases which are to be treated. In addition, tank 10 suitably supports a dry catalyst filter bed 16. Although the preferred embodiment of the present invention will be described for use in connection with a dry catalyst bed 16 which may be used in a sulfuric acid plant, it is to be understood, of course, that the principles of the present invention may be suitably employed to effectively clean dry catalyst beds used in other industrial applications.

Since the catalyst filter bed 16 is to be subsequently described for use in a sulfuric acid plant, such type of bed is ordinarily comprised of a catalyst mass 18, top and bottom layers 20 and 20' of silicious material or the like, and a tray 22.

The catalyst mass 18, in the preferred embodiment, is comprised of an aggregate of particulate matter which may essentially consist of pellets 24 of vanadium oxide or the like. The layers 20 and 20' of silicious material may be comprised of a plurality of quartz pebbles 26. The top layer 20 is defined by a top surface 28 and contacts and covers substantially the entire surface of the catalyst mass 18. The purpose of the top silicious layer is to prevent the catalyst from being moved by gas velocity or turbulence. The purpose of the bottom silicious layer 20' is to prevent the smaller catalyst particles from closing off openings 23 formed in tray 22 which might otherwise prevent or retard gas flow. It should herein be emphasized that the depth or thickness of the respective silicious layer 20 and catalyst mass 18 are standard. The tray 22 with openings 23 is made in a conventional fashion and is suitably connected to tank 10 in a well-known manner. Openings 23 are dimensioned to permit the free passage of the treated gases.

As perhaps best seen in FIG. 1 and in accordance with the principles of the present invention, a relatively flat screen member 30, having a plurality of openings 32 extending therethrough, has a configuration adapted to substantially cover the entire catalyst bed 16 and also, preferably, conform to the interior configuration of the tank 10. Such screen 30 is generally horizontally disposed with respect to and vertically situated above the top surface 28 for purposes which will be described presently. In a preferred embodiment, the screen 30 may have openings 32 which are generally polygonal in shape. Openings 32, however, are appropriately dimensioned to prevent the particulate matter, such as the vanadium pellets 24 and quartz pebbles 26, from being pulled through the screen 30. By having the screen 30 disposed on the top surface 28, the thickness of the silicious layer 20 will remain substantially uniform when subjected to the vacuuming operation to be presently described. Although in the particular embodiment being described screen 30 is shown contacting top surface 28, it should be pointed out that the present invention envisions that the screen may be appropriately vertically spaced with respect to top surface 28 without departing from the scope of the present invention, so long as an adequate suction force is applied to the catalyst bed 16 in a manner to be afterwards made clear.

With continued reference to FIG. 1, the vacuum means 34 is shown as including a hose 36, and a vacuum movement means 38. Hose 36 is connected to the movement means 38 as indicated by the phantom lines. The vacuum means 34 of the present invention may be a suitable type used in industry for cleaning industrial type materials. The present invention contemplates that hose 36 will appropriately be advanced by the vacuum movement means 38 to substantially vacuum the entire surface of the screen 30. In such a manner, it will, of course, serve to pull through the openings 32 the accumulated impurities which may have clogged the catalyst filter bed 16. Vacuum means 34, whenever operated in accordance with the theory and practice of the present invention, will be used in conjunction with screen 30 being interposed between it and the top surface 28. If such screen 30 were not so placed, the vanadium pellets 24 and the quartz pebbles 26 would be drawn up into the hose 36.

With specific reference to FIG. 2, taken in conjunction with FIG. 3, the raking means 40 may be of any appropriate type and construction, and is depicted as, basically, including raking movement means 42, a pair of vertical support legs 44, a generally horizontal elongated tine bar 46, and a plurality of discrete tines 48 having tip portions 50. The raking movement means 42 is appropriately connected to the pair of vertical legs 44 so as to suitably move the latter in different paths of movement, as will be more adequately set forth in the succeeding description of the present invention. Tines 48 are, in wellknown fashion, connected to tine bar 46 which is in turn affixed to support legs 44. Since the process of the present invention envisions the use of any suitable and appropriate type of raking device, such as the type typically used in the raking of industrial filter beds, only a general description thereof has been set forth above. Whatever raking means 40 is used, however, should be able to move the tines 48 in at least two directions which are at substantially right angles to each other.

With continued reference to FIG. 2, it will be clearly depicted that each of the respective individual tines 48 is appropriately disposed into the catalyst filter bed 16 so that the tip portions 50 extend through the silicious layer 20 and at least a top portion of the catalyst mass 18. By way of specific example, it has been determined that for a particularly successful raking action, that the tines 48 may extend into the top surface of catalyst mass 18 by a distance of at least two inches. This depth of penetration by the plurality of discrete tines 48 is sufficient to cause an appropriate agitation or stirring action as such tines are moved along the length of the enclosure walls 12. It should be understood, however, that the above example is given for purpose of illustration and not limitation. Screen 30, of course, has been appropriately removed prior to the insertion and penetration of tines 48 into the catalyst filter bed 16, as above described. As tines 48 are appropriately advanced along the substantial length of the catalyst bed 16 as shown in FIG. 2, such raking action is effective to adequately provide for an agitation or stirring process which serves to loosen accumulated particles of impurities, such as dust and dirt, from the catalyst mass 18 and to facilitate the subsequent removal of the thusly loosened impurities by the vacuum means 34.

For an adequate understanding of the vacuum cleaning operation of the present invention, reference is once again made to FIGS. 1 to 3, wherein the preferred procedural steps for completing such operation, as envisioned by the present invention, will be made more clear.

Specifically referring to FIG. 1, screen 30 has been appropriately placed on top surface 28 in the manner indicated above. Hose 36 is vertically disposed above the screen 30 and is suitably actuated by vacuum movement means 38 to move substantially over the entire surface area thereof. In such a manner, hose 36 will serve to pull through the openings 32, such impurities, as dust and the like, which have accumulated in the quartz pebbles 26 and catalyst mass 18. At the conclusion, of this particular vacuuming step, screen 30 is raised off top surface 28 and, as clearly depicted in either FIGS. 2 and 3, the raking means 40 has been suitably actuated so that tip portions 50 of the tines 48 extend through the layer 20 of silicious material and into at least a top portion of the vanadium pellets 24. Raking means 40, whenever appropriately actuated will move in a first direction along the longitudinal extent of channel 14, as shown in FIG. 2. During this movement, tines 48 act to break up surface encrustations of dirt and loosen the accumulated particles of dust from the vanadium pellets 24 and quartz pebbles 26 by an agitation process. Accordingly, the loosened dust impurities may be subsequently more easily pulled through screen 30 by vacuum means 34. Additionally, such raking action serves to provide greater access from the top surface 28 to accumulated impurities, thereby also enabling a more efficient cleaning during subsequent vacuuming steps.

The next sequence of steps in the cleaning operation of the present invention is to again place screen 30 on top surface 28 and thereafter re-vacuum the catalyst filter bed 16 with vacuum means 34 in a similar manner as aforedescribed to thereby pull additional quantities of accumulated impurities through screen 30. Raking means 40 is again arranged relative to catalyst filter bed 16 as before so that tip portions 50 extend through layer 20 and at least a top portion of the catalyst mass 18. Of course, it should be realized that screen 30 has been appropriately removed prior to this second raking operation. In this particular step the raking means 40 is actuated so that tines 48 move in a second direction, as shown in FIG. 3, which is transverse to the first direction. Such raking step functions to better agitate the layer 20 of silicious material and catalyst mass 18 so as to further break up surface encrustations, loosen impurities, and provide greater access for the vacuum means 34 to subsequently vacuum the accumulated impurities. In having this second raking performed at substantially right angles to the first direction of raking movement, the raking operation also further serves to level the bed. At the end of the aforenoted second raking step, screen 30 is again appropriately placed on the top surface 28, and vacuuming means 34 with hose 36 is reactivated to re-vacuum the catalyst filter bed 16, thereby pulling even more quantities of dust through screen 30.

While only two vacuuming and raking steps have been described, it should be emphasized that such steps may be repeated any appropriate number of times without departing from the principles of the present invention. Additionally, although the screen 30 was placed on to surface 28 during the vacuuming steps and removed therefrom so as to permit raking, the present invention also envisions that the screen may be vertically spaced relative to top surface and then have tines interposed between the top surface 28 and screen 30 to perform the raking operation (FIG. 2).

By way of specific example, it has been determined that by using the process as aforedescribed on a catalyst bed, such as the type utilized in a sulfuric acid plant and having a dimension of 27,368 liters, that no catalyst mass loss was experienced due to screening abrasion, approximately one-half the amount of men were required on each shift to remove and screen the catalyst mass as compared to the number used by a services contractor, significantly less downtime was required as compared with the typical time it takes a services contractor to perform such work, and services contractor's fees are eliminated. Consequently, more than 400 man hours of labor costs are saved. Furthermore, the catalyst bed will be able to be placed in operation at an earlier time.

As is believed readily apparent from the foregoing description of the operation and specific examples of such processes, cleaning of dry catalyst filter beds in accordance with the present invention may be performed in a relatively simple, continuous, and yet, efficient and economical manner.

While the invention has been described in connection with the preferred embodiment, it is not intended to limit the invention to the particular form set forth above, but on the contrary, it is intended to cover such alternative modifications and equivalents as may be included within the spirit and scope of the invention as defined by the appended claims.

What is claimed is:

1. A process adapted for use in cleaning impurities from a dry filter bed having particulate matter comprising the steps of:
    arranging a screen having a plurality of openings being of a size smaller than that of the particulate matter for preventing particulate matter from passing therethrough such that the screen is generally horizontally disposed with respect to and vertically spaced from the top surface area of the filter bed;
    subjecting the surface of the screen and filter bed to a vacuum so as to thereby pull the impurities from the filter bed and through the screen;
    advancing a rake device through the particulate matter of the filter bed in a first direction of movement for loosening the impurities from the particulate matter and for providing greater access to the impurities;
    subjecting the raked filter bed and screen to a vacuum device to thereby pull additional impurities from the filter bed and through the screen;
    advancing the rake device through the particulate matter of the filter bed in a second direction which is substantially transverse to the first direction of movement for further loosening the impurities and particulate matter and for providing greater access to the impurities from a top surface thereof; and
    subjecting the surface of the twice raked particulate matter and screen to a vacuum to thereby pull additional impurities from the filter bed and through the screen.

2. A process as set forth in claim 1 wherein said step of vertically arranging the screen over the surface area of the particulate matter includes the placing of the screen on the top surface of the particulate matter such that the screen is removed before each of said raking steps and replaced on the top surface before each of said vacuuming steps.

3. A process adapted for use in cleaning dust from the particulate matter of a catalyst mass in a sulfuric acid plant comprising the steps of:

arranging a screen having a plurality of openings being of a size smaller than that of the particulate matter for preventing particulate matter from passing therethrough such that the screen is generally horizontally disposed with respect to and vertically spaced above the surface area of the particulate matter;

advancing a vacuum device over the surface of the particulate matter and the screen to thereby pull dust from the particulate matter and through the screen;

advancing a rake device through at least a top portion of the particulate matter in a first direction of movement for breaking surface encrustations and for providing increased exposure to remaining dust particles;

advancing the vacuum device over the raked particulate matter and the screen for pulling additional dust from the particulate matter and through the screen;

advancing the rake device through at least a top portion of the particulate matter in a second direction generally transverse to the first direction of movement for providing a greater and more thorough agitation of the particulate matter and for providing greater exposure to the remaining dust particles; and, advancing the vacuum device over the raked particulate matter for pulling additional dust from the particulate matter and through the screen.

4. A vacuum cleaning process adapted for use in cleaning the particulate matter forming both a catalyst mass and a layer of particulate quartz material covering the catalyst mass in a sulfuric acid plant by comprising the steps of:

arranging a screen having a plurality of openings being of a size smaller than that of the particulate matter for preventing particulate matter from passing therethrough such that the screen is generally horizontally disposed with respect to and vertically arranged on the top surface of the quartz material;

moving a vacuum device over the surface area of the screen to thereby pull dust and other similar impurities through the screen;

removing the screen from over the surface of the particulate matter;

raking the particulate matter with a plurality of tines by moving the tines in a first direction through the layer of quartz material and at least a top portion of the catalyst mass for breaking surface encrustations and loosening particles in the catalyst mass and layer of quartz material and for providing better exposure to remaining dust by the vacuum device;

laying the screen on the layer of quartz material;

moving the vacuum device over the surface of the screen to thereby pull dust impurities through the screen;

removing the screen from over the surface of the layer of quartz material;

raking the layer of quartz material and catalyst mass with the tines by moving the tines in a direction generally transverse to the first direction;

rearranging the screen over the surface of the particulate matter; and, moving the vacuum device over the surface of the screen to thereby pull additional impurities through the screen.

* * * * *